United States Patent
Oh et al.

(10) Patent No.: US 11,984,587 B2
(45) Date of Patent: May 14, 2024

(54) NEGATIVE ELECTRODE ACTIVE MATERIAL, NEGATIVE ELECTRODE INCLUDING THE NEGATIVE ELECTRODE ACTIVE MATERIAL, AND SECONDARY BATTERY INCLUDING THE NEGATIVE ELECTRODE

(71) Applicant: LG ENERGY SOLUTION, LTD., Seoul (KR)

(72) Inventors: Il Geun Oh, Daejeon (KR); Sun Young Shin, Daejeon (KR); Se Hui Sohn, Daejeon (KR); Yong Ju Lee, Daejeon (KR); Se Mi Park, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 0 days.

(21) Appl. No.: 17/910,601

(22) PCT Filed: Sep. 10, 2021

(86) PCT No.: PCT/KR2021/012369
§ 371 (c)(1),
(2) Date: Sep. 9, 2022

(87) PCT Pub. No.: WO2022/055309
PCT Pub. Date: Mar. 17, 2022

(65) Prior Publication Data
US 2023/0155118 A1 May 18, 2023

(30) Foreign Application Priority Data
Sep. 11, 2020 (KR) .................. 10-2020-0117153

(51) Int. Cl.
H01M 4/38 (2006.01)
H01M 4/02 (2006.01)

(52) U.S. Cl.
CPC ...... *H01M 4/386* (2013.01); *H01M 2004/021* (2013.01); *H01M 2004/027* (2013.01)

(58) Field of Classification Search
CPC ........... H01M 4/386; H01M 2004/021; H01M 2004/027; H01M 4/364; H01M 4/483;
(Continued)

(56) References Cited

U.S. PATENT DOCUMENTS

2001/0051580 A1* 12/2001 Nagata ................ C03C 10/0045
501/63
2016/0372753 A1 12/2016 Fukasawa et al.
(Continued)

FOREIGN PATENT DOCUMENTS

EP 3678230 A1 7/2020
EP 3965187 A1 3/2022
(Continued)

OTHER PUBLICATIONS

International Search Report (with partial translation) and Written Opinion dated Dec. 23, 2021, for corresponding International Patent Application No. PCT/KR2021/012369.

*Primary Examiner* — Helen Oi K Conley
(74) *Attorney, Agent, or Firm* — Bryan Cave Leighton Paisner LLP

(57) ABSTRACT

The present invention relates to: a negative electrode active material including silicon-based composite particles containing $SiO_x$ (0<x<2) and a $MgSiO_3$ phase, wherein the $MgSiO_3$ phase includes a first $MgSiO_3$ phase having an enstatite structure and a second $MgSiO_3$ phase having a clinoenstatite structure at a weight ratio of 1:1 to 1:5; a negative electrode including the same; and a secondary battery including the negative electrode.

10 Claims, 1 Drawing Sheet

(58) Field of Classification Search
CPC .... H01M 4/502; H01M 4/131; H01M 10/052; H01M 4/362; H01M 4/366; H01M 4/62; H01M 4/625; H01M 10/4235; Y02E 60/10

See application file for complete search history.

(56) References Cited

U.S. PATENT DOCUMENTS

| | | |
|---|---|---|
| 2020/0295352 A1 | 9/2020 | Oh |
| 2021/0074995 A1 | 3/2021 | Shin et al. |
| 2022/0077467 A1 | 3/2022 | Oh et al. |
| 2022/0209228 A1 | 6/2022 | Oh et al. |
| 2023/0067691 A1 | 3/2023 | Shin et al. |

FOREIGN PATENT DOCUMENTS

| | | |
|---|---|---|
| JP | 2001-102698 A | 4/2001 |
| JP | 2010-170943 A | 8/2010 |
| JP | 6573646 B2 | 9/2019 |
| KR | 10-2019-0030676 A | 3/2019 |
| KR | 10-2019-0066596 A | 6/2019 |
| KR | 10-1999191 B1 | 7/2019 |
| KR | 10-2019-0093176 A | 8/2019 |
| KR | 10-2019-0116012 A | 10/2019 |
| KR | 10-2020-0090058 A | 7/2020 |

\* cited by examiner

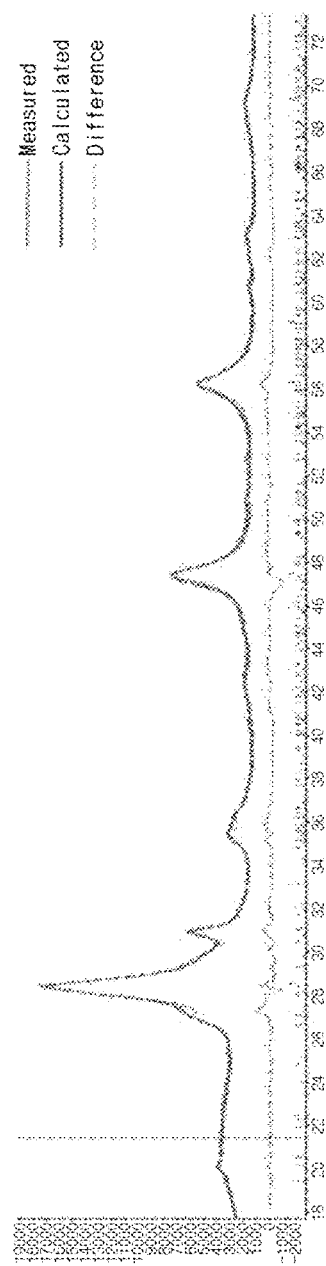

NEGATIVE ELECTRODE ACTIVE MATERIAL, NEGATIVE ELECTRODE INCLUDING THE NEGATIVE ELECTRODE ACTIVE MATERIAL, AND SECONDARY BATTERY INCLUDING THE NEGATIVE ELECTRODE

CROSS-REFERENCE TO RELATED APPLICATIONS

This application claims the benefit of the priority of Korean Patent Application No. 10-2020-0117153, filed on Sep. 11, 2020, the disclosure of which is incorporated herein in its entirety by reference.

TECHNICAL FIELD

The present invention relates to a negative electrode active material, a negative electrode including the negative electrode active material, and a secondary battery including the negative electrode, and specifically, the negative electrode active material is characterized by including silicon-based composite particles containing $SiO_x$ (0<x<2) and a $MgSiO_3$ phase, wherein the $MgSiO_3$ phase includes a first $MgSiO_3$ phase having an enstatite structure and a second $MgSiO_3$ phase having a clinoenstatite structure at a weight ratio of 1:1 to 1:5.

BACKGROUND ART

Requirements for the use of alternative energy or clean energy have increased due to the rapid increase in the use of fossil fuels, and, as a part of this trend, power generation and electricity storage using an electrochemical reaction are the most actively researched areas.

Currently, a typical example of an electrochemical device using the electrochemical energy may be a secondary battery and there is a trend that its usage area is expanding more and more. In recent years, demand for secondary batteries as an energy source has been significantly increased as technology development and demand with respect to portable devices, such as portable computers, mobile phones, and cameras, have increased, and, among these secondary batteries, lithium secondary batteries having high energy density, i.e., high capacity, have been subjected to considerable research and have been commercialized and widely used.

In general, a secondary battery is composed of a positive electrode, a negative electrode, an electrolyte, and a separator. The negative electrode includes a negative electrode active material in which lithium ions from the positive electrode are intercalated and deintercalated, and silicon-based particles having high discharge capacity may be used as the negative electrode active material. However, $SiO_2$ in silicon-based particles such as $SiO_x$ (0<x<2) partially reacts with lithium ions from the positive electrode to generate lithium silicate, and the lithium silicate acts as an irreversible phase, thereby reducing the initial efficiency of the battery. In addition, the silicon-based particles excessively change in volume during the charge and discharge and cause a side reaction with the electrolyte. Thus, there occurs a problem of reducing a life of the battery.

Conventionally, to solve this problem, a technique, in which metal such as Mg is intentionally doped to silicon-based particles to block a reaction site that may be irreversibly formed, thereby improving the initial efficiency, is being used. However, although the initial efficiency can be improved, without considering an appropriate composition, there are problems in that merely doping of metal is hard to improve the life characteristics of the battery, and capacity per weight is significantly reduced by the doping of metal.

Therefore, there is an urgent need to develop a silicon-based active material that may have an appropriate level of capacity and initial efficiency of the battery while the life characteristics of the battery can be improved.

DISCLOSURE OF THE INVENTION

Technical Problem

An aspect of the present invention provides a negative electrode active material that may have an appropriate level of capacity and initial efficiency of the battery while the life characteristics of the battery can be improved, and a negative electrode and a secondary battery including the same.

Technical Solution

According to an aspect of the present invention, there is provided a negative electrode active material including silicon-based composite particles containing $SiO_x$ (0<x<2) and a $MgSiO_3$ phase, wherein the $MgSiO_3$ phase includes a first $MgSiO_3$ phase having an enstatite structure and a second $MgSiO_3$ phase having a clinoenstatite structure at a weight ratio of 1:1 to 1:5.

According to another aspect of the present invention, there is provided a negative electrode including the negative electrode active material, and a secondary battery including the negative electrode.

Advantageous Effects

A negative electrode active material according to an embodiment of the present invention includes a $MgSiO_3$ phase, and thus the initial efficiency of a battery may be improved. In addition, a first $MgSiO_3$ phase having an enstatite structure and a second $MgSiO_3$ phase having a clinoenstatite structure are included at a weight ratio of 1:1 to 1:5, and thus the second $MgSiO_3$ clinoenstatite phase located around a Si phase can suppress the excessive volume expansion of the Si phase in the silicon-based composite particles during the charge of the battery. Accordingly, the structural stability of the negative electrode may be improved and the life characteristics of the battery may be improved. In addition, resistance to the intercalation of lithium ions is not great, and thus the problem caused by the electrolyte side reactions may be minimized and discharge capacity may be improved.

BRIEF DESCRIPTION OF THE DRAWINGS

FIG. 1 is an XRD graph for confirming the weight ratio of a first $MgSiO_3$ phase having an enstatite structure and a second $MgSiO_3$ phase having a clinoenstatite structure in silicon-based particles.

MODE FOR CARRYING OUT THE INVENTION

Hereinafter, the present invention will be described in more detail to allow for a clearer understanding of the present invention.

It will be understood that terms or words used in the present disclosure and claims should not be interpreted as having a meaning that is defined in common or in dictionaries, however should be interpreted in consistent with the technical scope of the present invention based on the principle that inventors may appropriately define the concept of the terms to explain the invention at his best method.

The terminology used herein is for the purpose of describing particular exemplary embodiments only and is not intended to limit the present invention. As used herein, the singular forms, "a," "an" and "the" are intended to include the plural forms as well unless the context clearly indicates otherwise.

It will be understood that the terms "include," "comprise," or "have" when used in the specification, specify the presence of stated features, numbers, steps, elements, or combinations thereof, but do not preclude the presence or addition of one or more other features, numbers, steps, elements, or combinations thereof.

In the present specification, an average particle diameter ($D_{50}$) may be defined as a particle diameter at a cumulative volume of 50% in a particle size distribution curve. The average particle diameter ($D_{50}$), for example, may be measured by using a laser diffraction method. The laser diffraction method may generally measure a particle diameter ranging from a submicron level to a few mm, and may obtain highly repeatable and high resolution results.

In the specification, a specific surface area is measured by degassing an object to be measured at 200° C. for 8 hours and performing $N_2$ adsorption/desorption at 77K using a BET measurement instrument (BEL-SORP-MAX, Nippon Bell).

<Negative Electrode Active Material>

A negative electrode active material according to an embodiment of the present invention includes silicon-based composite particles containing $SiO_x$ (0<x<2) and a $MgSiO_3$ phase, and the $MgSiO_3$ phase may include a first $MgSiO_3$ phase having an enstatite structure and a second $MgSiO_3$ phase having a clinoenstatite structure at a weight ratio of 1:1 to 1:5.

The negative electrode active material includes silicon-based composite particles.

The silicon-based composite particles contain the $SiO_x$ (0<x<2) and the $MgSiO_3$ phase.

The $SiO_x$ (0<x<2) corresponds to a matrix in the silicon-based composite particles. The $SiO_x$ (0<x<2) may be in a form including Si and $SiO_2$, and the Si may form a phase. That is, x above corresponds to a ratio of the number of 0 to Si included in the $SiO_x$ (0<x<2). When the silicon-based composite particles include the $SiO_x$ (0<x<2), the discharge capacity of a secondary battery may be improved.

The $MgSiO_3$ phase may be present on the surface of or inside the $SiO_x$ (0<x<2) that serves as a matrix. The initial efficiency of the battery may be improved by the $MgSiO_3$ phase.

The $MgSiO_3$ phase may be contained in an amount of 15 wt % to 60 wt %, particularly 15 wt % to 50 wt %, and more particularly 19 wt % to 22 wt % in the silicon-based composite particles. When the above range is satisfied, the reactivity of the silicon-based composite particles and water is reduced, and thus the discharge capacity, initial efficiency, and life characteristics of the battery may be improved.

The $MgSiO_3$ phase may include a first $MgSiO_3$ phase having an enstatite structure and a second $MgSiO_3$ phase having a clinoenstatite structure. The enstatite structure means that $MgSiO_3$ crystal forms an orthorhombic structure, and the clinoenstatite structure means that the $MgSiO_3$ crystal forms a monoclinic structure.

The $MgSiO_3$ phase may include the first $MgSiO_3$ phase having the enstatite structure and the second $MgSiO_3$ phase having the clinoenstatite structure at a weight ratio of 1:1 to 1:5, and specifically, a weight ratio of 1:2 to 1:3. If the amount of the second $MgSiO_3$ phase (the clinoenstatite structure) is too large unlike the range of 1:1 to 1:5, the resistance to the intercalation of lithium increases excessively, thus increasing potential of the silicon-based composite particles, and electrolyte side reaction excessively occurs on the surface of the silicon-based composite particles. In addition, substances generated by the electrolyte side reaction increase the resistance to the intercalation of lithium ions, and thus there is a problem of continuously reducing effects. In addition, if the amount of the second $MgSiO_3$ phase (the clinoenstatite structure) is small, unlike the range of 1:1 to 1:5, the structural stability of the silicon-based composite particles is significantly reduced, and thus the structure of the silicon-based composite particles is collapsed.

In other words, when the weight ratio of the first $MgSiO_3$ phase having the enstatite structure and the second $MgSiO_3$ phase having the clinoenstatite structure satisfies a weight ratio of 1:1 to 1:5, there are the following effects. Based on an appropriate content of the second $MgSiO_3$ phase having the clinoenstatite structure, the second $MgSiO_3$ clinoenstatite phase located around the Si phase can suppress the excessive volume expansion of the Si phase in the silicon-based composite particles during the charge of the battery. Accordingly, the structural stability of the negative electrode may be improved, thereby improving the life characteristics of the battery. In addition, the resistance to the intercalation of lithium ions is not great, and thus the problem caused by the electrolyte side reactions may be minimized and the discharge capacity may be improved.

The weight ratio of the first $MgSiO_3$ phase having the enstatite structure and the second $MgSiO_3$ phase having the clinoenstatite structure may be confirmed by XRD Rietveld refinement method. Referring to FIG. 1, an XRD measurement graph ("Measured" in FIG. 1) for the silicon-based composite particles is plotted by using D4 ENDEAVOR/X-ray diffraction equipment manufactured by Bruker Co. Thereafter, the XRD measurement graph is compared with various XRD reference graphs ("Calculated" in FIG. 1), and the most similar XRD reference graph (determined as "Difference" in FIG. 1) to the XRD measurement graph is found. Thereafter, the weight ratio can be determined by a manner of identifying if the XRD reference graph is plotted at what weight ratio of the first $MgSiO_3$ phase having the enstatite structure and the second $MgSiO_3$ phase having the clinoenstatite structure. Here, the XRD reference graph is that an XRD graph pattern exhibited in a state, in which the first $MgSiO_3$ phase having the enstatite structure and the second $MgSiO_3$ phase having the clinoenstatite structure are mixed, is theoretically derived through a theoretical XRD graph pattern of each of the first $MgSiO_3$ phase having the enstatite structure and the second $MgSiO_3$ phase having the clinoenstatite structure.

The silicon-based composite particles may not include a $Mg_2SiO_4$ phase, or may include 10 wt % or less of the $Mg_2SiO_4$ phase, and specifically, 5 wt % or less. When the above range is satisfied, the capacity and efficiency of the battery may be improved.

The silicon-based composite particles may not include a MgO phase, or may include 1 wt % or less of the MgO phase, and specifically, 0.5 wt % or less. When the above range is satisfied, the side reaction of the silicon-carbon composite particles and moisture may be minimized, and thus the stability of the battery may be improved.

The silicon-based composite particles do not include silicon crystal grains, or the silicon-based composite particles include the silicon crystal grains, and a size of the silicon crystal grains may be 15 nm or less, and specifically 10 nm or less. When the above range is satisfied, the reduction in life of the battery due to the volume expansion of the silicon crystal grains may be minimized. The size of the crystal grains may be determined by Scherrer equation.

The silicon-based composite particles may have an average particle diameter ($D_{50}$) of 4 μm to 10 μm, specifically 5 μm to 6.5 μm, and more specifically 6.15 μm to 6.4 μm. When the above range is satisfied, blocking a conductive network in the negative electrode may be prevented despite the volume expansion of the silicon-based composite particles, and the life of the battery may be improved.

The silicon-based composite particles may have a specific surface area of 1 $m^2/g$ to 15 $m^2/g$, specifically 4 $m^2/g$ to 8 $m^2/g$, and more specifically 6.45 $m^2/g$ to 6.7 $m^2/g$. When the above range is satisfied, the irreversible sites in the silicon-based composite particles may be minimized, thereby suppressing the reduction of battery efficiency.

The negative electrode active material may further include a carbon coating layer disposed on a surface of the silicon-based composite particles.

The carbon coating layer is formed on the silicon-based composite particles, thus the conductivity is imparted to the silicon-based composite particles, and the initial efficiency, life characteristics, and capacity characteristics of the secondary battery including the negative electrode active material containing the silicon-based composite particle may be improved.

The carbon coating layer may include at least one of amorphous carbon and crystalline carbon.

The crystalline carbon may further improve the conductivity of the silicon-based composite particles. The crystalline carbon may include at least one selected from the group consisting of fullerenes, carbon nanotubes, and graphene.

The amorphous carbon may suppress the expansion of the silicon-based composite particles by appropriately maintaining strength of the carbon coating layer. The amorphous carbon may be a carbide of at least one selected from the group consisting of tar, pitch, and other organic materials, or may be a carbon-based material formed by using a hydrocarbon as a source of chemical vapor deposition.

The carbide of the other organic materials may be a carbide of sucrose, glucose, galactose, fructose, lactose, mannose, ribose, aldohexose, or ketohexose, and a carbide of an organic material selected from a combination thereof.

The hydrocarbon may be a substituted or unsubstituted aliphatic or alicyclic hydrocarbon, or a substituted or unsubstituted aromatic hydrocarbon. The substituted or unsubstituted aliphatic or alicyclic hydrocarbon may include methane, ethane, ethylene, acetylene, propane, butane, butene, pentane, isobutane, or hexane. The substituted or unsubstituted aromatic hydrocarbon may include benzene, toluene, xylene, styrene, ethylbenzene, diphenylmethane, naphthalene, phenol, cresol, nitrobenzene, chlorobenzene, indene, coumarone, pyridine, anthracene, or phenanthrene.

The carbon coating layer may be contained in an amount of 3 to 5 parts by weight with respect to 100 parts by weight of the silicon-based composite particles. When the above range is satisfied, the reduction in the capacity and efficiency of the negative electrode active material may be prevented.

The carbon coating layer may have a thickness of 10 μm to 100 μm, and specifically, 30 μm to 50 μm. When the above range is satisfied, the conductivity of the silicon-based composite particles is improved, and thus there is an effect of improving the initial efficiency and life of the battery.

A method for preparing the above-described negative electrode active material includes forming the silicon-based composite particles, and may further include, if necessary, forming carbon coating layer after the forming of the silicon-based composite particles.

The forming of the silicon-based composite particles may include forming Mg—SiO-based particles by mixing Si, $SiO_2$, and Mg and then reacting at a particular sublimation temperature, followed by cooling the mixture in a cooling zone having a particular cooling temperature and performing further heat-treatment at a particular further heat-treatment temperature.

A mixed ratio (weight ratio) of the mixture of the Si and the $SiO_2$ to the Mg is preferably 97:3 to 85:15, and a mole ratio of the Si and the $SiO_2$ is preferably 1:0.8 to 1:1.2. In this case, the growth of the silicon crystal grain may be suppressed and the $MgSiO_3$ phase may be formed.

The sublimation temperature may be 1,400° C. to 1,600° C., and specifically 1,430° C. to 1,500° C. When the above range is satisfied, it may be suppressed that the silicon-based composite particles have a porous structure by an appropriate sublimation speed.

The cooling temperature may be 600° C. to 900° C., and when the above range is satisfied, it may be suppressed that the silicon-based composite particles have a porous structure by an appropriate cooling speed. The cooling may be performed in a vacuum state.

The further heat-treatment temperature may be 700° C. to 1,000° C., and specifically 750° C. to 850° C. When the above range is satisfied, MgO generated during the preparation is converted into $MgSiO_3$, and thus the side reaction of the silicon-based composite particles and moisture may be suppressed, and the amount of the first $MgSiO_3$ phase having the enstatite structure and the second $MgSiO_3$ phase having the clinoenstatite structure may be adjusted. The further heat-treatment may be performed in an inert atmosphere such as Ar.

In the present invention, in order for the first $MgSiO_3$ phase having the enstatite structure and the second $MgSiO_3$ phase having the clinoenstatite structure to satisfy the weight ratio of 1:1 to 1:5, it is important to make an optimum combination with the above-described sublimation temperature, cooling temperature, further heat-treatment temperature, and the mixed amount of Si/$SiO_2$/Mg.

<Negative Electrode>

A negative electrode according to another embodiment of the present invention may include a negative electrode active material, wherein the negative electrode active material is the same as the negative electrode active material of the above-described embodiments. Specifically, the negative electrode may include a negative electrode current collector and a negative electrode active material layer disposed on the negative electrode current collector. The negative electrode active material layer may include the negative electrode active material. Furthermore, the negative electrode active material layer may further include a binder and/or a conductive agent.

The negative electrode current collector is not particularly limited so long as it has conductivity without causing adverse chemical changes in the battery. For example, copper, stainless steel, aluminum, nickel, titanium, sintered carbon, or aluminum or stainless steel that is surface-treated with one of carbon, nickel, titanium, silver, or the like may be used. Specifically, a transition metal that adsorbs carbon well, such as copper and nickel, may be used as the current collector. The current collector may have a thickness of 6 μm to 20 μm, but the thickness of the current collector is not limited thereto.

The binder may include at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, a styrene-butadiene rubber (SBR), a fluorine rubber, poly acrylic acid, and a material having hydrogen thereof substituted with lithium (Li), sodium (Na), or calcium (Ca), or may include various copolymers thereof.

The conductive agent is not particularly limited as long as it has conductivity without causing adverse chemical changes in the battery, and, conductive materials, for example, graphite such as natural graphite and artificial graphite; carbon black such as acetylene black, Ketjen black, channel black, furnace black, lamp black, and thermal black; conductive fibers such as carbon fibers or metal fibers; conductive tubes such as carbon nanotubes; fluorocarbon powder; metal powder such as aluminum powder, and nickel powder; conductive whiskers such as zinc oxide whiskers and potassium titanate whiskers; conductive metal oxide such as titanium oxide; or polyphenylene derivatives, may be used.

<Secondary Battery>

The secondary battery according to another embodiment of the present invention may include the negative electrode of the above-described embodiment. Specifically, the secondary battery may include a negative electrode, a positive electrode, a separator disposed between the negative electrode and the positive electrode, and an electrolyte, wherein the negative electrode is the same as the above-described negative electrode. Since the negative electrode has been described above, detailed descriptions thereof will be omitted.

The positive electrode may include a positive electrode current collector and a positive electrode active material layer which is formed on the positive electrode current collector and includes a positive electrode active material.

In the positive electrode, the positive electrode current collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode current collector may typically have a thickness of 3 μm to 500 μm and may have a surface with fine roughness to improve adhesion to the positive electrode active material. For example, the positive electrode current collector may be used in various forms such as a film, a sheet, a foil, a net, a porous body, a foam, and a non-woven fabric body.

The positive electrode active material may be a typically used positive electrode active material. Specifically, the positive electrode active material may include a layered compound, such as lithium cobalt oxide ($LiCoO_2$) or lithium nickel oxide ($LiNiO_2$), or a compound substituted with one or more transition metals; lithium iron oxides such as $LiFe_3O_4$; lithium manganese oxides such as $Li_{1+c1}Mn_{2-c1}O_4$ ($0 \leq c1 \leq 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; nickel (Ni)-site type lithium nickel oxide expressed by a chemical formula of $LiNi_{1-c2}M_{c2}O_2$ (where M is at least one selected from the group consisting of cobalt (Co), manganese (Mn), aluminum (Al), copper (Cu), iron (Fe), magnesium (Mg), boron (B), and gallium (Ga), and c2 satisfies $0.01 \leq c2 \leq 0.3$); lithium manganese composite oxide expressed by a chemical formula of $LiMn_{2-c3}M_{c3}O_2$ (where M is at least one selected from the group consisting of Co, Ni, Fe, chromium (Cr), zinc (Zn), and tantalum (Ta), and c3 satisfies $0.01 \leq c3 \leq 0.1$) or $Li_2Mn_3MO_8$ (where M is at least one selected from the group consisting of Fe, Co, Ni, Cu, and Zn); and $LiMn_2O_4$ having a part of Li being substituted with alkaline earth metal ions, but the positive electrode active material is not limited thereto. The positive electrode may be Li-metal.

The positive electrode active material layer may include a positive electrode conductive agent and a positive electrode binder as well as the above-described positive electrode active material.

In this case, the positive electrode conductive agent is used for providing conductivity to the electrode, wherein any conductive agent may be used without particular limitation as long as it has electronic conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used.

Also, the positive electrode binder functions to improve binding between positive electrode active material particles and adhesion between the positive electrode active material and the positive electrode current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used.

The separator separates the negative electrode and the positive electrode and provides a movement path of lithium ions, wherein any separator may be used as the separator without particular limitation as long as it is typically used in a secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. In addition, a typical porous non-woven fabric, for example, a non-woven fabric formed of high melting point glass fibers, polyethylene terephthalate fibers, or the like may be used. Furthermore, a coated separator including a ceramic component or a polymer material may be used in order to secure heat resistance or mechanical strength, and may be optionally used in a single-layered or a multi-layered structure.

The electrolyte may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but is not limited thereto.

Specifically, the electrolyte may include a non-aqueous organic solvent and a metal salt.

For example, aprotic organic solvents, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate, may be used as the non-aqueous organic solvent.

Particularly, among the carbonate-based organic solvents, since ethylene carbonate and propylene carbonate, as cyclic carbonate, are highly viscous organic solvents and well dissociate a lithium salt due to high permittivity, the cyclic carbonate may be preferably used. Since an electrolyte having high electrical conductivity may be prepared when the above cyclic carbonate is mixed with low viscosity, low permittivity linear carbonate, such as dimethyl carbonate and diethyl carbonate, in an appropriate ratio and used, the cyclic carbonate may be more preferably used.

A lithium salt may be used as the metal salt, and the lithium salt is a material that is readily soluble in the non-aqueous electrolyte solution, wherein, for example, at least one selected from the group consisting of $F^-$, $Cl^-$, $I^-$, $NO_3^-$, $N(CN)_2^-$, $BF_4^-$, $C_1O_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

At least one additive, for example, a haloalkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the above-described electrolyte components for the purpose of improving life characteristics of the battery, preventing a decrease in battery capacity, and improving discharge capacity of the battery.

According to another embodiment of the present invention, a battery module including the secondary battery as a unit cell and a battery pack including the battery module are provided. Since the battery module and the battery pack include the secondary battery having high capacity, high rate capability, and high cycle characteristics, the battery module and the battery pack may be used as a power source of a medium and large sized device selected from the group consisting of an electric vehicle, a hybrid electric vehicle, a plug-in hybrid electric vehicle, and a power storage system.

Hereinafter, preferred examples will be provided for better understanding of the present invention. It will be apparent to those skilled in the art that these examples are only provided to illustrate the present invention and various modifications and alterations are possible within the scope and technical spirit of the present invention, and such modifications and alterations are definitely included in the attached claims.

EXAMPLES AND COMPARATIVE EXAMPLES

Example 1: Preparation of Negative Electrode Active Material

Powder (94 g) in which Si and $SiO_2$ was mixed in a mole ratio of 1:1 and Mg (6 g) were mixed in a reaction furnace, and then the resulting mixture was heated under vacuum at a sublimation temperature of 1,400° C. Then, the mixed gas of Si, $SiO_2$, and Mg gasified was reacted in a cooling zone in a vacuum state having a cooling temperature of 800° C. to cooled to be a solid phase. Then, a heat-treatment was performed in an inert atmosphere at a temperature (further heat-treatment temperature) of 800° C. to prepare Mg—SiO-based particles. Then, the Mg—SiO-based particles were pulverized by using a ball mill to prepare silicon-based composite particles having a size of 6 μm. Then, while an Ar gas was flowed in, thus maintaining the inert atmosphere, the silicon-based composite particles were located in a hot zone of CVD equipment, Ar was used as a carrier gas, and the methane was blown in the hot zone at 900° C., reacting in $10^{-1}$ torr for 20 minutes to prepare a negative electrode active material in which carbon coating layer was formed on a surface of the silicon-based composite particles.

Example 2: Preparation of Negative Electrode Active Material

A negative electrode active material was prepared in the same manner as in Example 1 except that the sublimation temperature was 1,450° C.

Example 3: Preparation of Negative Electrode Active Material

A negative electrode active material was prepared in the same manner as in Example 1 except that the sublimation temperature was 1,350° C.

Example 4: Preparation of Negative Electrode Active Material

A negative electrode active material was prepared in the same manner as in Example 1 except that the sublimation temperature was 1,000° C.

Comparative Example 1: Preparation of Negative Electrode Active Material

A negative electrode active material was prepared in the same manner as in Example 1 except that the sublimation temperature was 1,480° C.

Comparative Example 2: Preparation of Negative Electrode Active Material

A negative electrode active material was prepared in the same manner as in Example 1 except that the sublimation temperature was 1,320° C.

Comparative Example 3: Preparation of Negative Electrode Active Material

A negative electrode active material was prepared in the same manner as in Example 1 except that the sublimation temperature was 1,500° C.

Comparative Example 4: Preparation of Negative Electrode Active Material

A negative electrode active material was prepared in the same manner as in Example 1 except that the sublimation temperature was 1,280° C.

Comparative Example 5: Preparation of Negative Electrode Active Material

A negative electrode active material was prepared in the same manner as in Example 1 except that the further heat-treatment was not performed.

Comparative Example 6: Preparation of Negative Electrode Active Material

A negative electrode active material was prepared in the same manner as in Example 1 except that the further heat-treatment temperature was 600° C.

Comparative Example 7: Preparation of Negative Electrode Active Material

A negative electrode active material was prepared in the same manner as in Example 1 except that the further heat-treatment temperature was 1,100° C.

contents through the XRD Rietveld refinement method by using the D4 ENDEAVOR/X-ray diffraction equipment manufactured by Bruker Co.

It was possible to confirm the content of the first $MgSiO_3$ phase having the enstatite structure, the content of the second $MgSiO_3$ phase having the clinoenstatite structure, and the weight ratio of the first $MgSiO_3$ phase having the enstatite structure and the second $MgSiO_3$ phase having the clinoenstatite structure through the XRD Rietveld refinement method by using the D4 ENDEAVOR/X-ray diffraction equipment manufactured by Bruker Co.

The average particle diameter ($D_{50}$) of the silicon-based composite particles was confirmed through PSD instrument.

The specific surface area of the silicon-based composite particles was confirmed by a BET analyzer.

Experimental Example 1: Evaluation of Discharge Capacity, Initial Efficiency, Life (Capacity Retention) Characteristics Each negative electrode active material of Examples and Comparative Examples was used to prepare a negative electrode and a battery.

The negative electrode active material, carbon black as a conductive agent, and carboxymethyl cellulose (CMC) and a styrene-butadiene rubber (SBR) as a binder were mixed at a weight ratio of 95.8:1:1.7:1.5 to prepare a mixture. Then, distilled water (7.8 g) was added to the mixture (5 g) and stirred to prepare a negative electrode slurry. The negative electrode slurry was coated on a 20 μm thick copper (Cu) metal thin film, as a negative electrode current collector, and then dried. In this case, a temperature of circulating air was 60° C. Subsequently, the negative electrode current collector

TABLE 1

| | | $MgSiO_3$ | | | | | | |
|---|---|---|---|---|---|---|---|---|
| | Content (wt %) of $MgSiO_3$ | Content (wt %) of first $MgSiO_3$ phase having enstatite structure | Content (wt %) of second $MgSiO_3$ phase having clinoenstatite structure | Weight ratio of first $MgSiO_3$ phase having enstatite structure and second $MgSiO_3$ phase having clinoenstatite structure | Content (wt %) of $Mg_2SiO_4$ | Content (wt %) of MgO | Average particle diameter ($D_{50}$) of silicon-based composite particles | Specific surface area ($m^2/g$) of silicon-based composite particles |
| Example 1 | 20 | 6 | 14 | 1:2.33 | 3.2 | 0 | 6.2 | 6.6 |
| Example 2 | 22.5 | 5 | 17.5 | 1:3.50 | 1.5 | 0 | 6.1 | 6.4 |
| Example 3 | 19 | 7.5 | 11.5 | 1:1.53 | 4 | 0 | 6.2 | 6.8 |
| Example 4 | 20.4 | 6.2 | 14.2 | 1:2.29 | 3 | 0 | 6.5 | 6.2 |
| Comparative Example 1 | 23 | 3 | 20 | 1:6.67 | 1.2 | 0 | 6.1 | 6.8 |
| Comparative Example 2 | 18.7 | 9.9 | 8.8 | 1:0.89 | 4.2 | 0 | 6.2 | 6.3 |
| Comparative Example 3 | 23.5 | 1 | 22.5 | 1:22.50 | 0.8 | 0 | 6.3 | 6.4 |
| Comparative Example 4 | 16 | 15.5 | 0.5 | 1:0.03 | 6 | 0 | 6.1 | 6.5 |
| Comparative Example 5 | 14.7 | 8.5 | 6.2 | 1:0.73 | 3.8 | 1.2 | 6.3 | 6.2 |
| Comparative Example 6 | 14.8 | 8 | 6.8 | 1:0.85 | 3.8 | 1.8 | 6.1 | 6.6 |
| Comparative Example 7 | 19.2 | 3 | 16.2 | 1:5.4 | 3.8 | 0 | 6.2 | 6.4 |

The content of $MgSiO_3$, the content of $Mg_2SiO_4$, and the content of MgO mean the contents (wt %) of $MgSiO_3$, $Mg_2SiO_4$, and MgO in the silicon-based composite particles, respectively, and it was possible to confirm each of the was roll-pressed and dried in a vacuum oven at 130° C. for 12 hours to prepare a negative electrode.

The prepared negative electrode was cut in a circle having an area of 1.7671 cm$^2$, and a lithium (Li) metal thin film was prepared as a positive electrode. A separator formed of porous polyethylene was interposed between the positive electrode and the negative electrode, then an electrolyte, in which vinylene carbonate was dissolved in an amount of 0.5 wt % in a mixed solution of methylethyl carbonate (EMC) and ethylene carbonate (EC) in a mixed volume ratio of 7:3, and in which $LiPF_6$ having a concentration of 1 M was dissolved, was injected thereto to prepare a lithium coin half-cell.

[00135] The prepared battery was charged and discharged, the discharge capacity, initial efficiency, and capacity retention were evaluated, and the results are shown in Table 2 below.

A first cycle and a second cycle were charged and discharged at 0.1 C, and a third cycle to a 49th cycle were charged and discharged at 0.5 C. A 300th cycle was terminated in a charged state (a state in which lithium is in the negative electrode), and the battery was disassembled to measure the thickness, and then the electrode thickness change rate was calculated.

Charging condition: CC (Constant Current)/CV (Constant Voltage) (5 mV/0.005 C current cut-off)

Discharging condition: CC (Constant Current) condition 1.5 V

The discharge capacity (mAh/g) and initial efficiency (%) were derived from the results during the first charge and discharge. Specifically, the initial efficiency (%) was derived from the following calculation.

Initial efficiency (%)=(discharge capacity after first discharge/first charge capacity)×100

The capacity retention and the electrode thickness change rate were derived from the following calculations, respectively.

Capacity retention (%)=(300th discharge capacity/first discharge capacity)×100

Electrode thickness change rate (%)=(change amount of final negative electrode thickness/initial negative electrode thickness)×100

TABLE 2

| Battery | Discharge capacity (mAh/g) | Initial efficiency (%) | Capacity retention (%) |
|---|---|---|---|
| Example 1 | 1460 | 82.6 | 92 |
| Example 2 | 1450 | 82.4 | 91 |
| Example 3 | 1430 | 82.4 | 91 |
| Example 4 | 1455 | 82.5 | 88 |
| Comparative Example 1 | 1400 | 81.9 | 85 |
| Comparative Example 2 | 1380 | 81.7 | 86 |
| Comparative Example 3 | 1360 | 81.2 | 84 |
| Comparative Example 4 | 1350 | 81.3 | 83 |
| Comparative Example 5 | 1280 | 78.2 | 80 |
| Comparative Example 6 | 1300 | 78.6 | 81 |
| Comparative Example 7 | 1456 | 82.1 | 70 |

The invention claimed is:

1. A negative electrode active material comprising silicon-based composite particles containing $SiO_x$ (0<x<2) and a $MgSiO_3$ phase, wherein the $MgSiO_3$ phase comprises a first $MgSiO_3$ phase having an enstatite structure and a second $MgSiO_3$ phase having a clinoenstatite structure at a weight ratio of 1:1 to 1:5.

2. The negative electrode active material of claim 1, wherein the $MgSiO_3$ phase is contained in an amount of 15 wt % to 60 wt % in the silicon-based composite particles.

3. The negative electrode active material of claim 1, wherein the silicon-based composite particles do not comprise a $Mg_2SiO_4$ phase, or comprise 10 wt % or less of the $Mg_2SiO_4$ phase.

4. The negative electrode active material of claim 1, wherein the silicon-based composite particles have an average particle diameter ($D_{50}$) of 4 μm to 10 μm.

5. The negative electrode active material of claim 1, wherein the silicon-based composite particles have a specific surface area of 1 $m^2$/g to 15 $m^2$/g.

6. The negative electrode active material of claim 1, further comprising a carbon coating layer disposed on a surface of the silicon-based composite particles.

7. The negative electrode active material of claim 6, wherein the carbon coating layer is contained in an amount of 3 to 5 parts by weight with respect to 100 parts by weight of the silicon-based composite particles.

8. The negative electrode active material of claim 1, wherein the silicon-based composite particles do not comprise silicon crystal grains, or the silicon-based composite particles comprise the silicon crystal grains, and a size of the silicon crystal grains is 15 nm or less.

9. A negative electrode comprising the negative electrode active material of claim 1.

10. A secondary battery comprising the negative electrode of claim 9.

* * * * *